United States Patent
Xiao et al.

(10) Patent No.: US 8,600,831 B2
(45) Date of Patent: Dec. 3, 2013

(54) AUTOMATED AUTOMOBILE MAINTENANCE USING A CENTRALIZED EXPERT SYSTEM

(75) Inventors: Hong Xiao, Acton, MA (US); Afshin Moshrefi, Newburyport, MA (US); Rahul Khushoo, Waltham, MA (US); Dongchen Wang, Concord, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 422 days.

(21) Appl. No.: 12/899,614

(22) Filed: Oct. 7, 2010

(65) Prior Publication Data
US 2012/0089474 A1    Apr. 12, 2012

(51) Int. Cl.
*G06Q 30/00* (2012.01)
(52) U.S. Cl.
USPC .................. 705/26.4; 701/31.5; 701/31.6
(58) Field of Classification Search
USPC .................. 705/26.1–27.2; 701/29.1–34.4
See application file for complete search history.

(56) References Cited

U.S. PATENT DOCUMENTS

| | | | |
|---|---|---|---|
| 2003/0009270 A1* | 1/2003 | Breed | 701/29 |
| 2009/0125178 A1* | 5/2009 | Wilson | 701/33 |
| 2012/0029759 A1* | 2/2012 | Suh et al. | 701/29 |

OTHER PUBLICATIONS

Its Vehicle Infrastructure/Security Market Could Be Boon for Motorola. (1996). Global Positioning & Navigation News, , 1.*

* cited by examiner

*Primary Examiner* — Resha Desai

(57) ABSTRACT

A system includes a database that stores an expert knowledgebase, and one or more servers configured to implement an expert system. The one or more servers receive sensor data associated with sensors from automobile maintenance systems associated with respective ones of multiple automobiles, and analyze the sensor data, using the expert system and the expert knowledgebase, to diagnose whether the multiple automobiles require maintenance and/or repair. The one or more servers send, via a network, results of the analysis of the sensor data to service stations for scheduling maintenance and/or repair of the multiple automobiles.

17 Claims, 13 Drawing Sheets

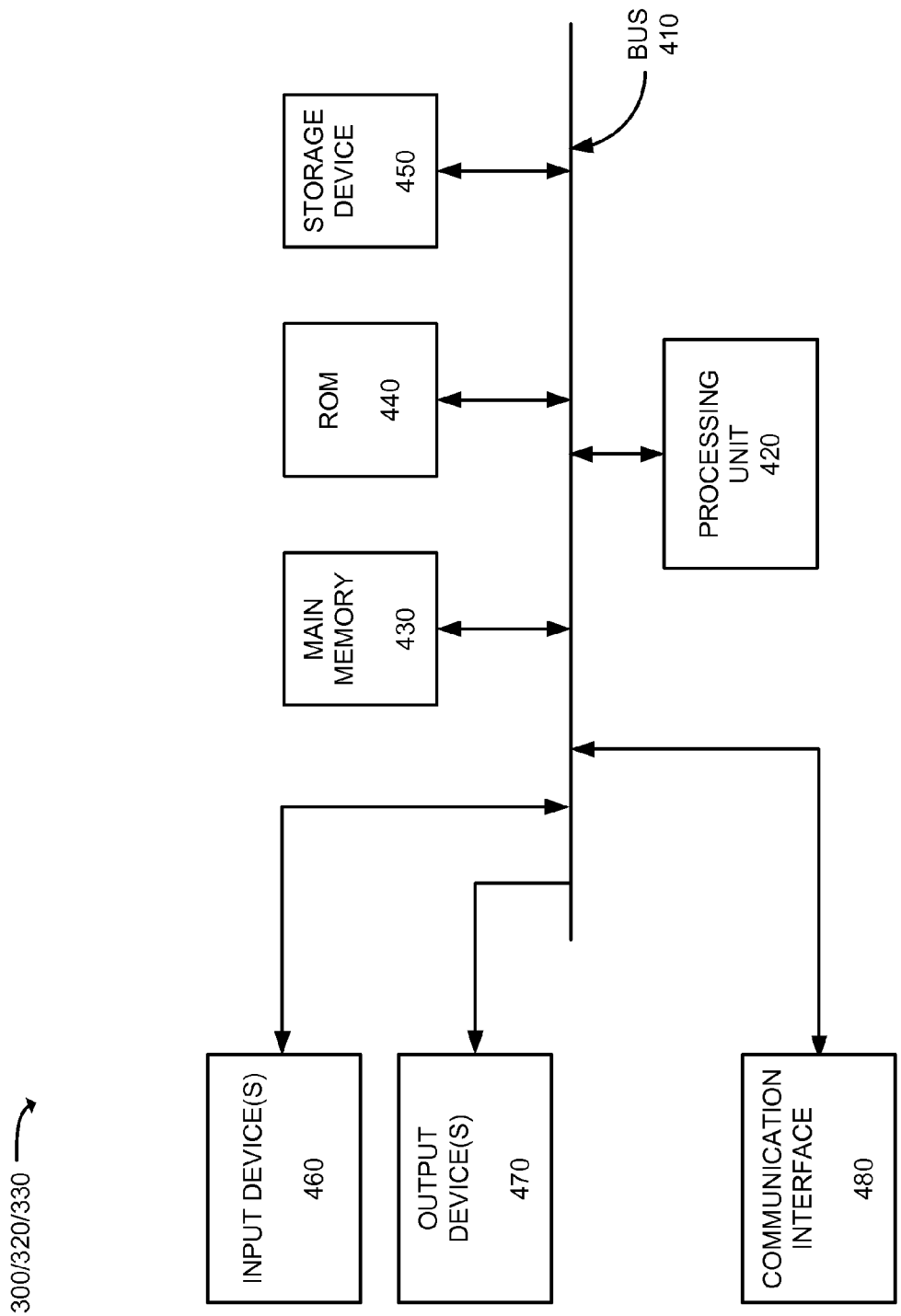

AUTOMATED AUTOMOBILE MAINTENANCE USING A CENTRALIZED EXPERT SYSTEM

BACKGROUND

A traditional automobile diagnostic system typically involves a serviceman plugging an electronic diagnostic system into an automobile, and the serviceman then reading diagnostic codes that relate to the automobile defect from the diagnostic system. The serviceman then searches for appropriate parts and/or components in a manual based on the diagnostic code obtained from the diagnostic system. The serviceman may then replace the parts and/or components obtained from the manual in the automobile.

BRIEF DESCRIPTION OF THE DRAWINGS

FIG. 4 is a diagram that depicts exemplary components of servers of FIG. 3;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

A traditional automobile diagnostic system, in which a serviceman uses an electronic diagnostic system, which the serviceman plugs into an automobile, to obtain diagnostic codes that can be referenced in a manual to obtain a list of parts that require replacement, has a number of disadvantages. Such disadvantages include high labor and time costs associated with performing the diagnostic activities, the fact that an automobile may need service without having any significant symptoms that are apparent to the driver, and the lack of transparency to the automobile owner who typically has no idea what is wrong with his/her automobile until a significant failure has occurred. When a failure does occur, the driver may find it difficult to obtain adequate information about what needs to be repaired on the automobile, what parts are required to repair the automobile, or the associated cost of labor and parts for repairing the automobile. The driver or owner of the automobile typically only discovers this information after the automobile has already been taken to the service station, the serviceman has performed a diagnostic, and the serviceman provides a repair cost estimate.

In embodiments described herein, an automobile owner may be able to have his/her automobile diagnosed, and to have the diagnosed defect described, and associated repair parts identified to the owner, prior to the owner taking the automobile to the service station for the repair. In further embodiments described herein, service stations may bid on the cost to repair the automobile prior to the owner taking the automobile to a service station for repair, thereby using competition to reduce the cost of repair to the owner.

Figure 1:
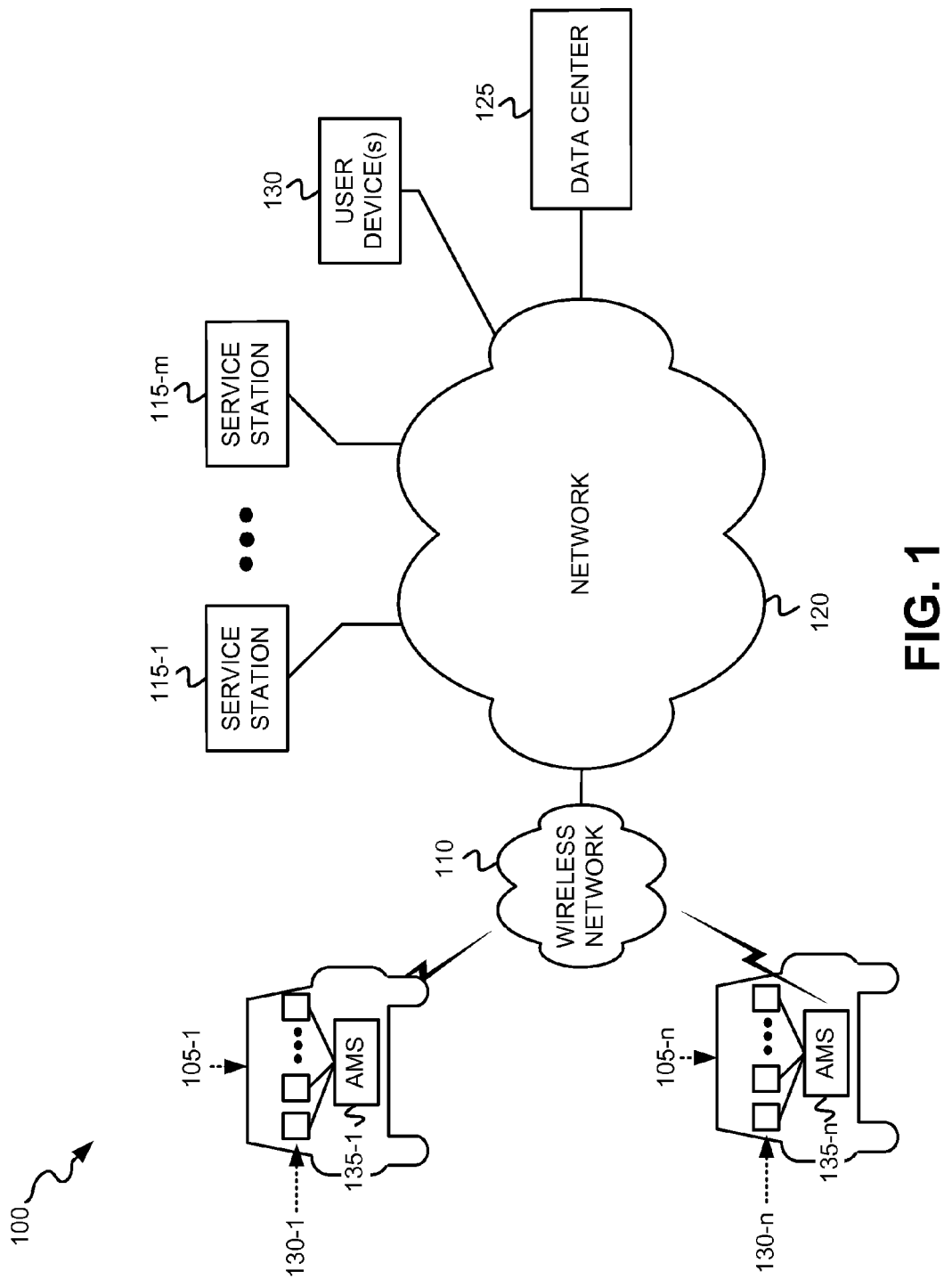
FIG. 1 is a diagram that depicts an exemplary environment in which automobile sensor data may be transmitted to a remote data center from the automobile, and the data center, using an expert system, may diagnose any maintenance and/or defects based on an expert knowledgebase.

FIG. 1 is a diagram that depicts an exemplary environment 100 in which automobile sensor data may be transmitted to a remote data center from the automobile, and the data center, using an expert system, may diagnose any maintenance and/or defects based on an expert knowledgebase. As shown, environment 100 may include multiple automobiles 105-1 through 105-*n* (where n is ≥2) (generically and individually referred to herein as an "automobile 105"), a wireless network 110, multiple service stations 115-1 through 115-*m* (where m is ≥2) (generically and individually referred to herein as a "service station 115"), a network 120, a data center 125, and a user device(s) 130. As further shown, automobiles 105-1 through 105-*n* may include sensor arrays 130-1 through 130-*n* (generically and individually referred to herein as a "sensor array 130") and automobile maintenance systems 135-1 through 135-*n* (generically and individually referred to herein as "automobile maintenance system 135" or "AMS 135"). Each automobile 105 may include a sensor array 130 and an automobile maintenance system (AMS) 135.

Sensor array 130 may include multiple sensors that sense or measure various parameters associated with the operation of automobile 105. Sensor array 130 may include sensors that detect one or more parameters associated with drive-train and vehicle control, driver safety, comfort, and emissions. The various sensors of sensor array 130 may be used to monitor temperature, gases, voltages/currents, air flow, vacuum and/or torques associated with the operation of automobile 105. Sensor array 130 may include, for example, sensors that measure tire pressure, sensors that measure brake pad status, a sensor that measures battery voltages (or other battery parameters), a sensor that measures engine temperature, a sensor that measures spark plug voltages, a sensor that detects engine Revolutions Per Minute (RPM), sensors that measure the rate at which a wheel of automobile 105 is turning compared to the speed of automobile 105, a sensor that detects a throttle position, and/or a sensor that measures a speed of automobile 105. The sensors described herein merely represent a few examples of different types of sensors. Any type of sensor that senses or measures various parameters associated with the operation of automobile 105 may be used in sensor array 130. The sensors may further include still image or video cameras and/or audio sensors that may sense images, video and/or audio associated with automobile 105.

AMS 135 may include a system that receives sensor data from each of the sensors of sensor array 130, and may generate automobile health data associated with the received sensor data. The health data may include, for example, any type of data that may be tagged to the sensor data, such as time stamps, environmental parameters (e.g., environmental temperature, humidity, wind velocity, etc.), vehicle related parameters, etc. AMS 135 may store the sensor data and automobile health data locally, and may cause the sensor data and automobile health data to be transmitted to data center 125 via a wireless connection to wireless network 110.

Wireless network 110 may one or more wireless satellite networks and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein. Wireless network 110 may receive sensor data and automobile health data from AMS 135 via a wireless connection, and may transmit the sensor and automobile health data to network 120.

Service stations 115-1 through 115-m (generically and individually referred to herein as "service station 115") may each include a service station that performs automobile maintenance and/or automobile repairs. Service stations 115-1 through 115-m may be distributed geographically, including, for example, nationally (i.e., across the U.S.), or internationally (e.g., across specific countries). Service stations 115-1 through 115-m may include stand-alone service stations or service centers associated with other business entities (e.g., service station at a car dealer, service station associated with a retail store, etc.). As shown in FIG. 1, each of service stations 115-1 through 115-m may include a device (e.g., a computer, etc.) that may receive data from data center 125, and may further access data stored at data center 125. Service stations 115-1 through 115-m may further transmit notifications (described below) to AMSs 135-1 through 135-n.

Network 120 may include one or more networks of any type, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network)

Data center 125 may include one or more server entities that receive sensor data from automobiles 105-1 through 105-n, and may implement an expert system (not shown), to analyze the sensor data to diagnose whether each of the automobiles 105-1 through 105-n may have an associated maintenance problem or a defect that needs to be repaired. Data center 125 may interact with service stations 115-1 through 115-m via network 20 to enable any automobile 105, that has a maintenance problem or defect, to be scheduled for repair.

User device(s) 130 may include a computational device that further includes network communication capabilities. User device(s) 130 may include a desktop, laptop, palmtop or tablet computer, a cellular telephone, or a personal digital assistant (PDA). User device(s) 130 may include transceiver mechanisms for communicating via network 120 and/or wireless network 110. User device(s) 130 may be used to access data for an automobile 105 stored at data center 125. User device(s) 130 may further receive and display notifications (described below) that may also be sent to a respective AMS 135. A different user device 130 may be associated with each different owner or driver of automobiles 105-1 through 105-n.

Figure 2:
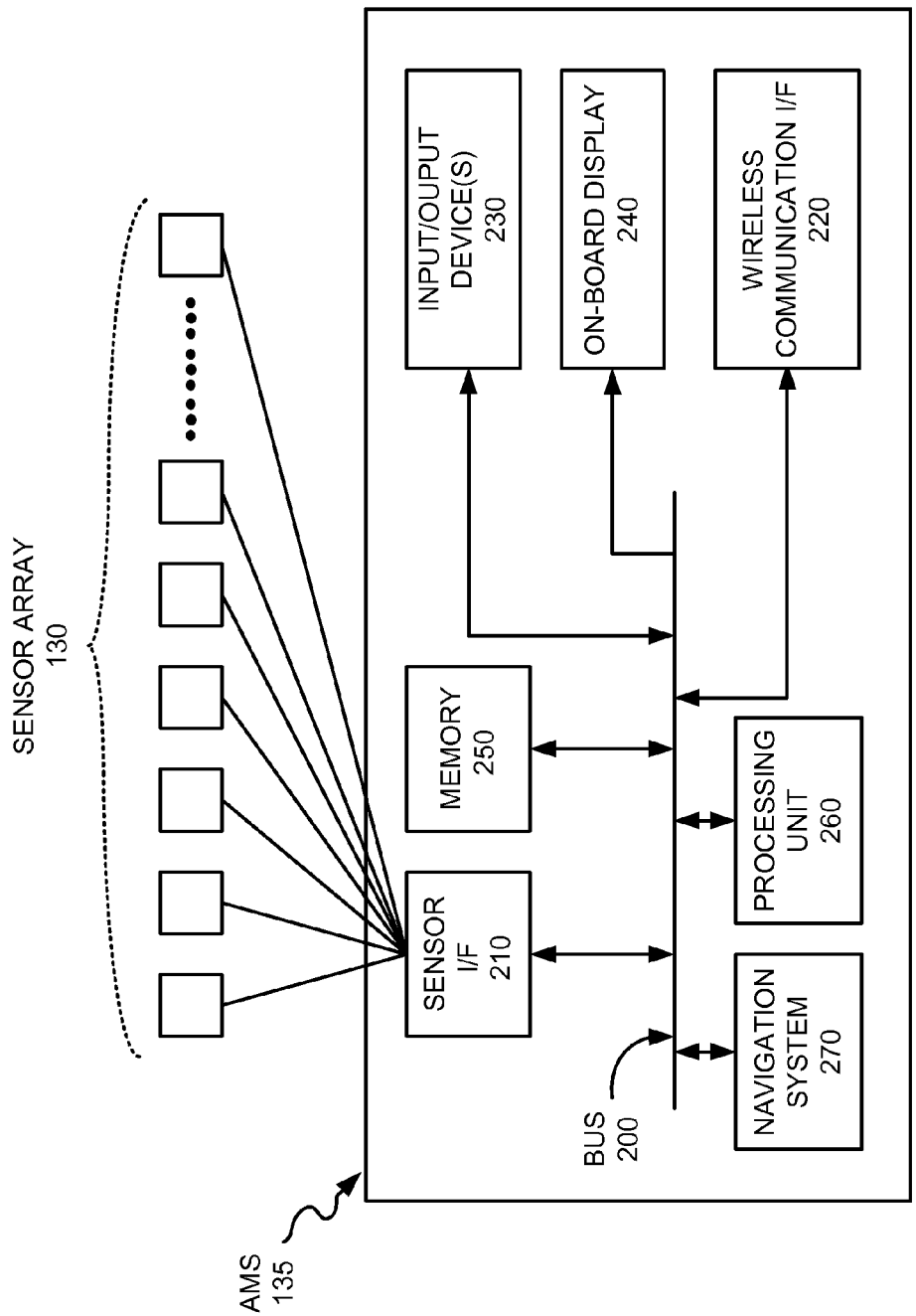
FIG. 2 is a diagram that depicts further details of the sensor array and Automobile Maintenance System (AMS) of FIG. 1.

FIG. 2 is a diagram that depicts further details of sensor array 130 and AMS 135. AMS 135 may include a bus 200, a sensor interface (I/F) 210, a wireless communication I/F 220, an input/output device(s) 230, an on-board display 240, a memory 250, a processing unit 260 and a navigation system 270.

Bus 200 may include a path that permits communication among the elements of AMS 135. Sensor I/F 210 may electrically interface with each sensor of sensor array 130 and may provide sensor data received from each sensor of sensor array 130 to processing unit 260 for processing and/or for storage in memory 250. Wireless communication I/F 220 may include a transceiver unit for transmitting and receiving data via a wireless connection (e.g., to wireless network 110). The transceiver unit of I/F 220 may include a cellular network radio frequency, or optical wireless, communication interface. Input/output device(s) 230 may permit an operator to input information to AMS 135 or to output information from AMS 135. For example, input/output device(s) 230 may include a keypad or a keyboard, voice recognition and/or biometric mechanisms, an audio speaker, etc. On-board display 240 may include a display, or a touch panel display, that may visually display images, video, data, and associated graphics, to a user of automobile 105. If display 240 includes a touch panel display, then display 240 may also operate as an input device for permitting the user of automobile 105 to input data into AMS 135. Memory 250 may include a random access memory (RAM), a read only memory (ROM), and/or another type of storage device that may store data and/or instructions for execution by processing unit 420. Memory 250 may further include a magnetic and/or optical recording medium and its corresponding drive. Processing unit 260 may include a processor, microprocessor, or processing logic that may interpret and execute instructions (e.g., stored by memory 250). Navigation system 270 may include a system that permits AMS 135 to provide navigation directions to the user of automobile 135 via on-board display 240. Navigation system 270 may include, for example, a Global Positioning System (GPS) device.

The configuration of components of AMS 135 illustrated in FIG. 2 is for illustrative purposes only. Other configurations may be implemented. Therefore, AMS 135 may include additional, fewer and/or different components than those depicted in FIG. 2.

Figure 3:
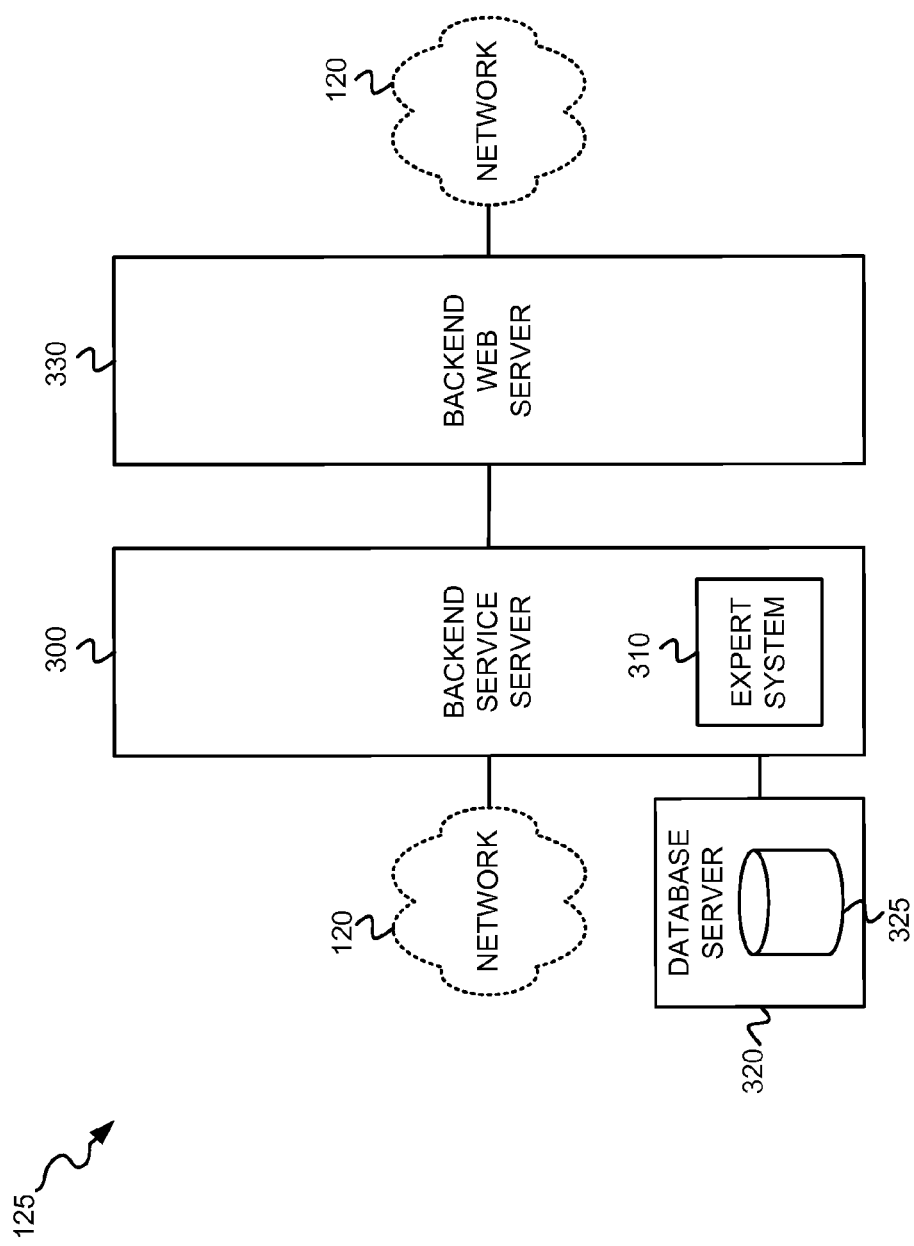
FIG. 3 is a diagram that depicts exemplary components of the data center of FIG. 1.

FIG. 3 is a diagram that depicts exemplary components of data center 125. Data center 125 may include a backend service server 300, an expert system 310, a database server 320, and a backend web server 330.

Backend service server 300 may receive sensor data and associated automobile heath data from respective ones of automobiles 105-1 through 105-n via a connection to network 120. Server 300 may supply the received sensor data and health data to database server 320 for storage. Server 300 may further implement an expert system 310 that may be used to analyze the received sensor data and associated automobile health data to diagnose maintenance problems and/or defects of respective ones of automobiles 105-1 through 105-n. Expert system 310 may be designed and implemented using existing techniques for implementing an expert system.

Database server 320 may receive sensor data and health data from backend service server 300 and may store the data in a database 325. Database server 320 may, for example, be part of a "cloud computing system." The data stored in database 325 may include an expert knowledgebase of data that may be used by expert system 310 for analyzing historical patterns and for identifying automobile maintenance problems and/or automobile defects that correspond to certain patterns of sensor data. The data (e.g., historical sensor data, repair data, etc.) associated with a specific automobile, stored in database 325, may be retrieved by an owner of the automobile via network 120 (e.g., using user device 130), or by a service station 115 authorized by the owner.

Backend web server 330 may implement one or more applications for communicating with service stations 115-1 through 115-m via network 120. The one or more applications may include, for examples, various types of web applications (e.g., email application, Instant Messaging (IM) application, web page generator, etc.).

The configuration of components of data center 125 illustrated in FIG. 3 is for illustrative purposes only. Other configurations may be implemented. Therefore, data center 125 may include additional, fewer and/or different components than those depicted in FIG. 3. For example, data center 125 is depicted as including multiple servers. However, in some implementations, servers 300, 320 and 330 may be implemented as a single server.

FIG. 4 is a diagram that depicts exemplary components of server 300. Servers 320 and 330 may be similarly configured. Server 300 may include a bus 410, a processing unit 420, a main memory 430, a read only memory (ROM) 440, a storage device 450, an input device(s) 460, an output device(s) 470, and a communication interface 480. Bus 410 may include a path that permits communication among the elements of server 300.

Processing unit 420 may include a processor, microprocessor, or processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium and its corresponding drive.

Input device(s) 460 may include one or more mechanisms that permit an operator to input information to server 300, such as, for example, a keypad or a keyboard, voice recognition and/or biometric mechanisms, etc. Output device(s) 470 may include one or more mechanisms that output information to the operator, including a display, a speaker, etc. Communication interface 480 may include any transceiver mechanism that enables server 300 to communicate with other devices and/or systems. For example, communication interface 480 may include mechanisms for communicating with another device or system via a network, such as network 120.

Server 300 may perform certain operations or processes, as described below. Server 300 may perform these operations in response to processing unit 420 executing software instructions contained in a computer-readable medium, such as memory 430. A computer-readable medium may include a physical or logical memory device. A logical memory device may include memory space within a single physical memory device or spread across multiple physical memory devices.

The software instructions may be read into main memory 430 from another computer-readable medium, such as storage device 450, or from another device via communication interface 480. The software instructions contained in main memory 430 may cause processing unit 420 to perform operations or processes that are described below. Alternatively, hardwired circuitry may be used in place of or in combination with software instructions to implement processes described herein. Thus, exemplary implementations are not limited to any specific combination of hardware circuitry and software.

The configuration of components of server 300 illustrated in FIG. 4 is for illustrative purposes only. Other configurations may be implemented. Therefore, server 300 may include additional, fewer and/or different components than those depicted in FIG. 4.

Figure 5A:
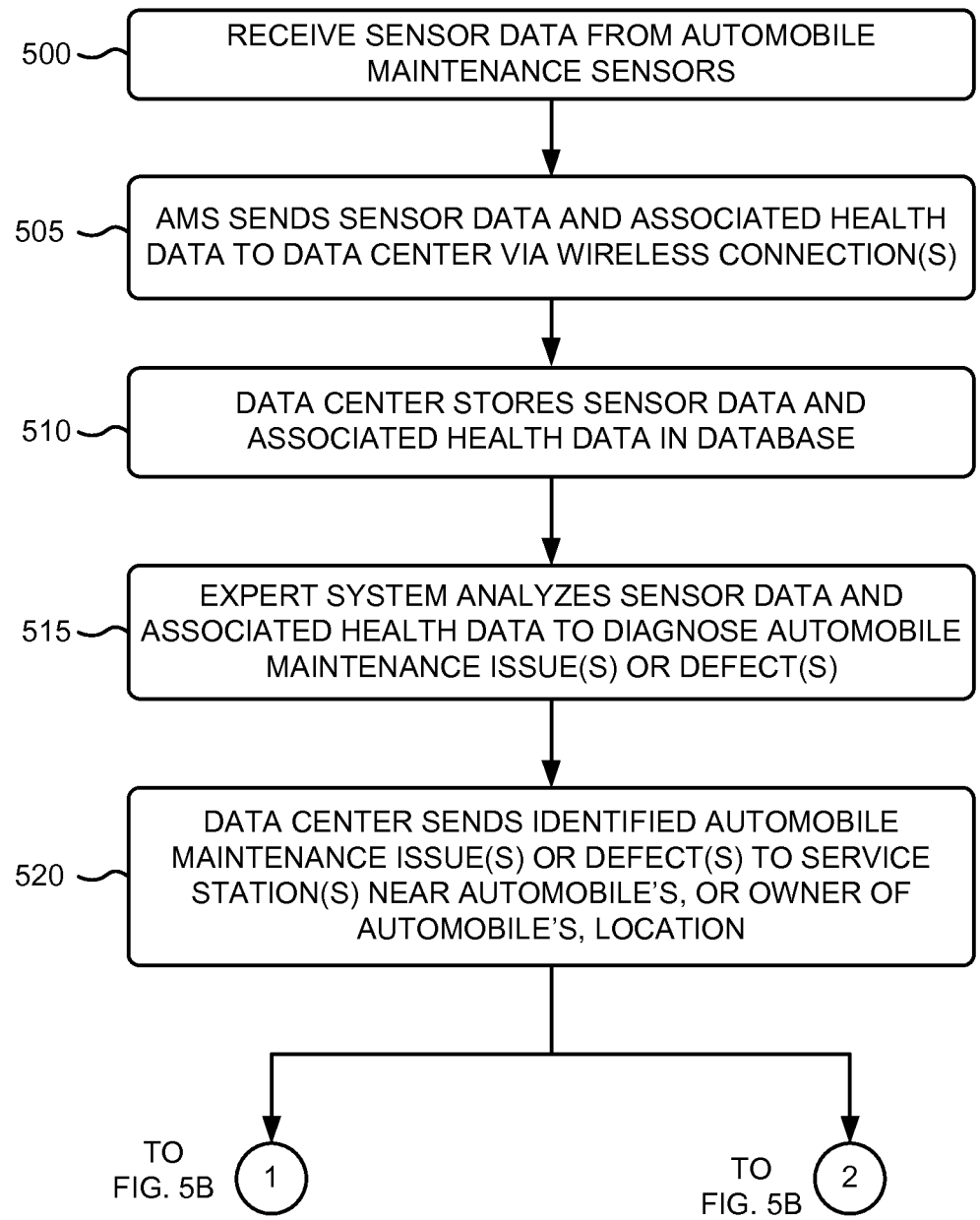
FIGS. 5A, 5B and 5C are flow diagrams illustrating an exemplary process for obtaining automobile sensor data from sensor arrays at one or more automobiles, analyzing the sensor data using an expert system to diagnose a maintenance problem or automobile defect, and notifying one or more service stations of the diagnosed maintenance problem or defect for scheduling maintenance or repair of the automobile.
Figure 5B:
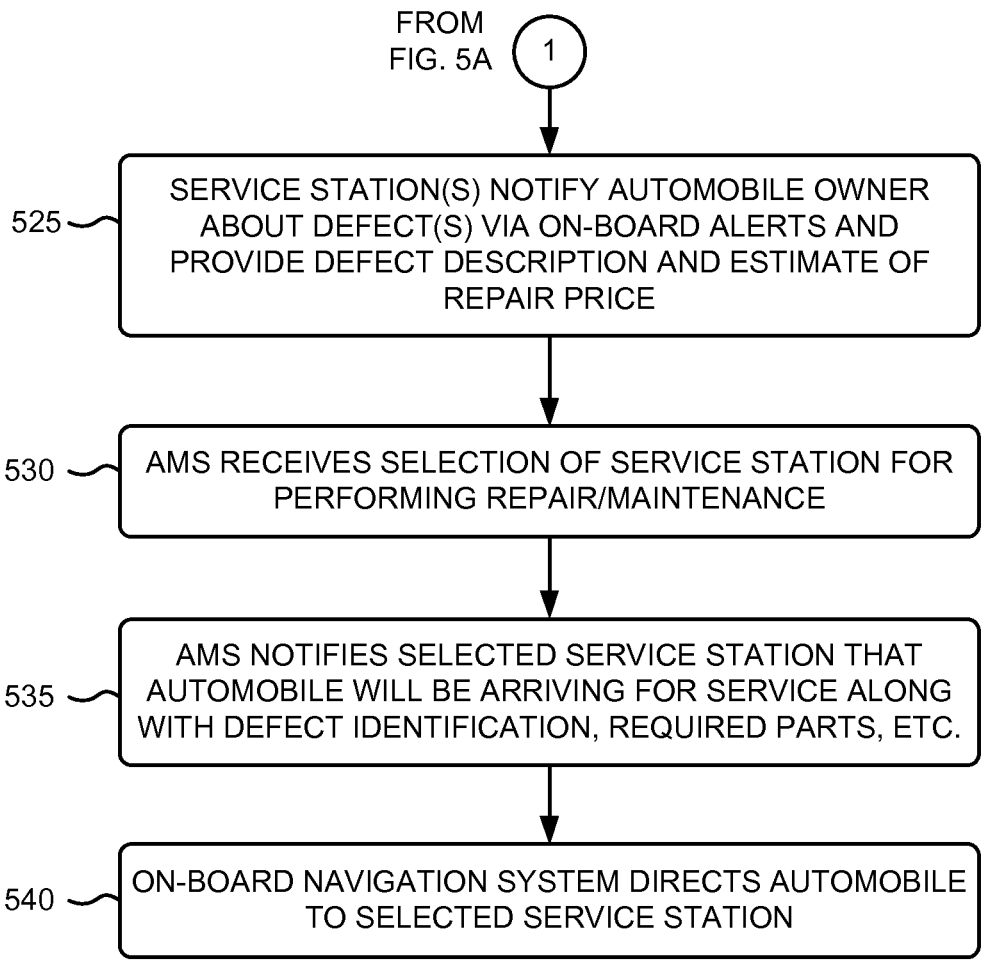
Figure 5C:
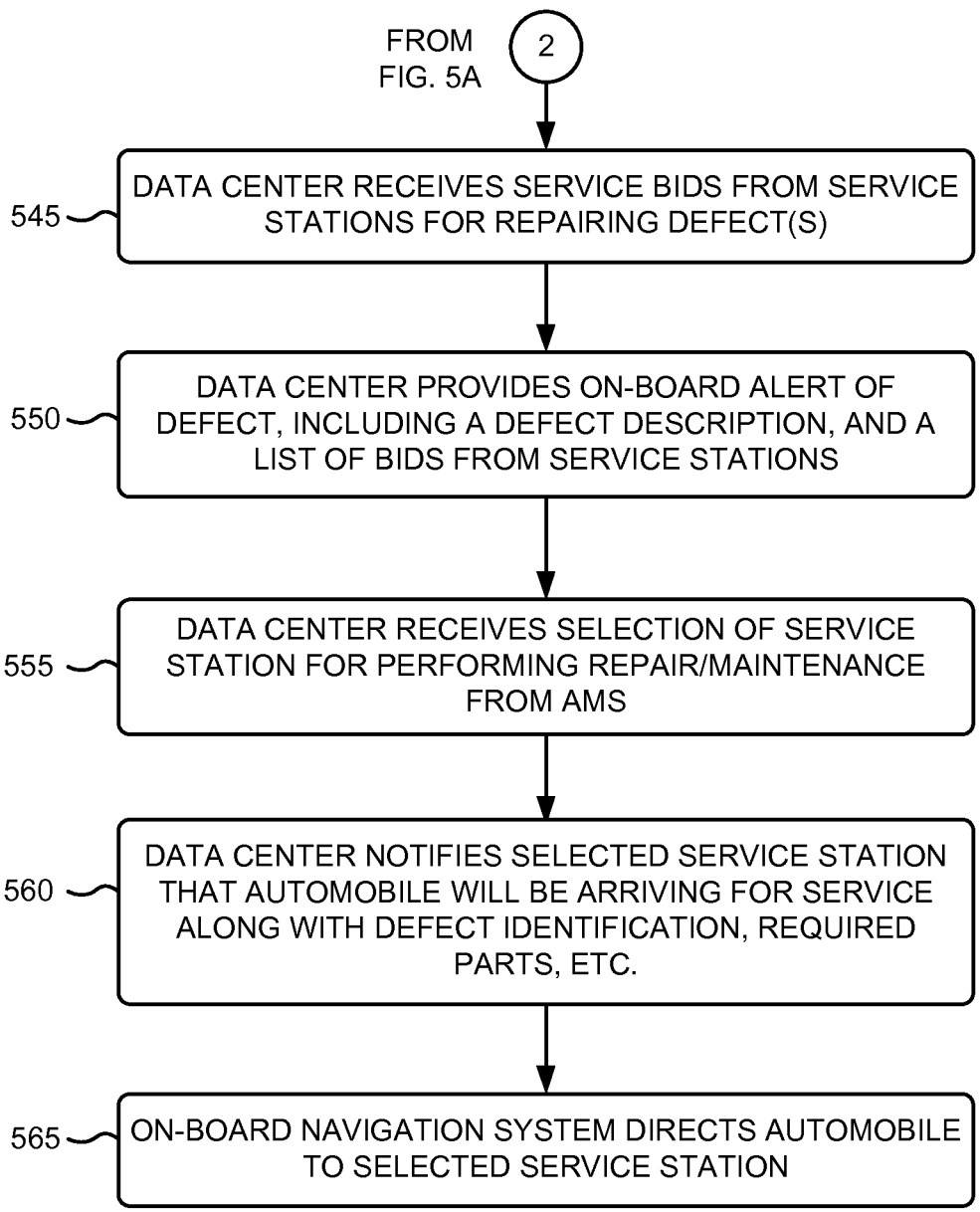

FIGS. 5A, 5B and 5C are flow diagrams illustrating an exemplary process for obtaining automobile sensor data from sensor arrays at one or more automobiles, analyzing the sensor data using an expert system to diagnose a maintenance problem or automobile defect, and notifying one or more service stations of the diagnosed maintenance problem or defect for scheduling maintenance or repair of the automobile. The exemplary process of FIGS. 5A-5C may be implemented by data center 125, in conjunction with service stations 115-1 through 115-m, and/or AMS 135. The description of the exemplary process of FIGS. 5A-5C below may refer to the exemplary messaging diagrams of FIGS. 6-8 and the exemplary on-board displays of FIGS. 9-11.

The exemplary process may include receiving sensor data from automobile maintenance sensors at AMS 135 (block 500). AMS 135 may receive sensor data from sensory array 130 via sensor I/F 210. Processing unit 260 of AMS 135 may store the received sensor data in memory 250 before transmitting to data center 125. AMS 135 may further identify automobile health data associated with the received sensor data. As shown in the messaging diagram of FIG. 6, AMS 135 may receive 600 sensor data from the automobile maintenance sensors.

AMS 135 may send the sensor data and associated health data to data center 125 via a wireless connection(s) (block 505). AMS 135 may send sensor data and associated health data to data center 125 at periodic intervals, or at the occurrence of specific events (e.g., at a significant automobile failure). Processing unit 260 of AMS 135 may cause wireless communication I/F 220 to transmit the sensor data and associated health data towards data center 125 via a wireless connection to wireless network 110. Wireless network 110 may forward the sensor data and health data to data center 125 via network 120. As depicted in the exemplary messaging diagram of FIG. 6, AMS 135 may send a message 605 that includes sensor and health data to data center 125.

Figure 6:
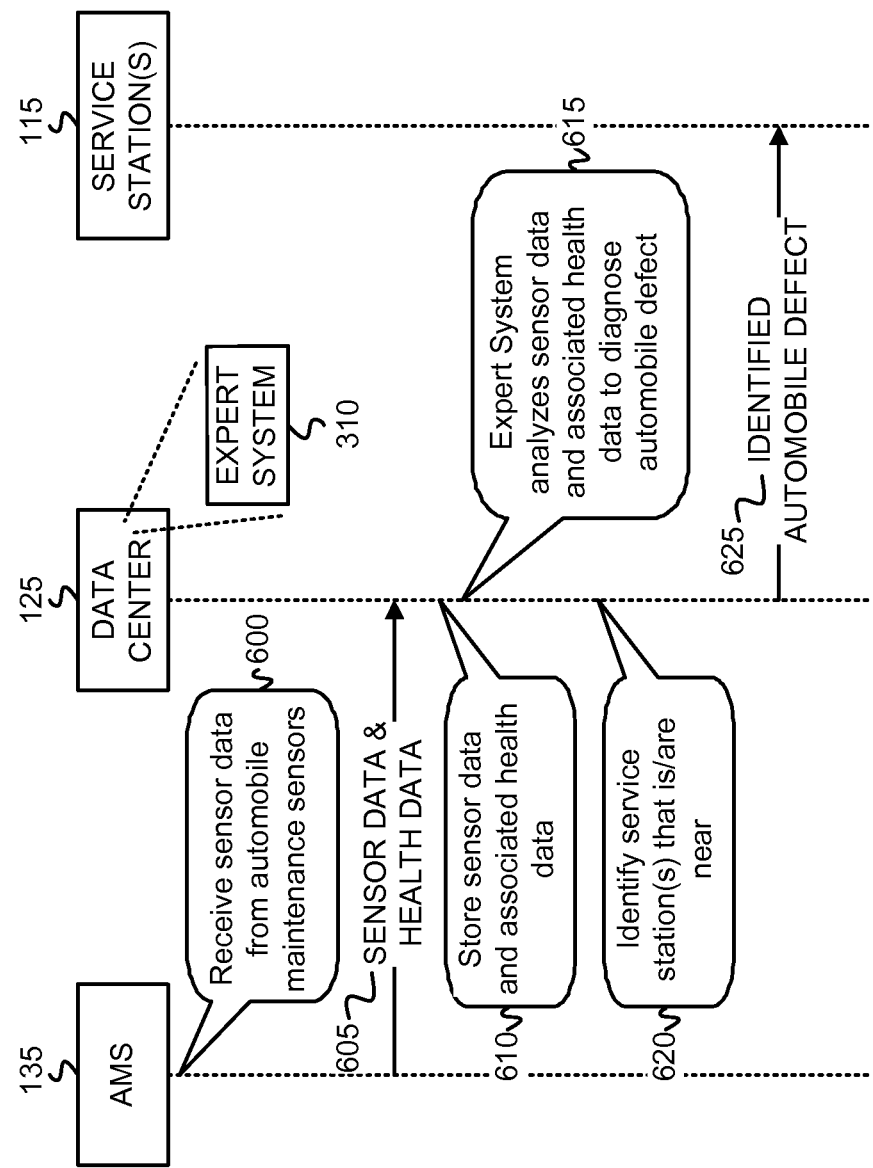
FIGS. 6-8 are exemplary messaging diagrams associated with the exemplary process of FIGS. 5A, 5B, and 5C.

Data center 125 may store the sensor data and associated health data in a database (block 510). Backend service server 300 of data center 125 may receive the sensor data and health data via network 120 and may forward the data to database server 320 for storage in database 325. As shown in the exemplary messaging diagram of FIG. 6, data center 125 may store 610 sensor data and associated health data. Expert system 310 may analyze the sensor data and the associated health data to diagnose one or more automobile maintenance issues or defects (block 515). Expert system 310 may utilize a knowledgebase and the expert system's inference rules to diagnose whether the automobile has any issues (e.g., maintenance issues or any defects). FIG. 6 depicts expert system 310 of data center 125 analyzing 615 sensor data and associated health data to diagnose an automobile defect.

Data center 125 may send the identified one or more automobile maintenance issues or defects to a service station(s) near the automobile's, or the automobile owner's, location (block 520). Backend web server 330 of data center 125 may send the identified one or more automobile maintenance issues or defects to a service station(s) via network 120. Data center 125 may obtain a geographic location associated with automobile 105 and may determine one or more service stations that are close to that geographic location. Alternatively, data center 125 may identify a residential address of the owner of automobile 105, and may determine one or more service stations that are close to the identified residential address. Data center 125 may then a message to the one or more service stations identifying the automobile, the automobile's owner, and the identified maintenance issue(s) and/or defect(s) to the one or more service stations. FIG. 6 depicts data center 125 sending a message 625 that includes an identification of an automobile defect identified by expert system 310.

The exemplary process may continue with two alternative implementations. In a first exemplary implementation, one or more service stations that propose performing maintenance/repair on automobile 105 may interact directly with automobile 105 via AMS 135. In a second exemplary implementation, one or more service stations that propose performing maintenance/repair on automobile 105 may interact with data center 125, which, in turn, provides service bids, defect descriptions, etc. to automobile 105 via AMS 135.

Figure 9:
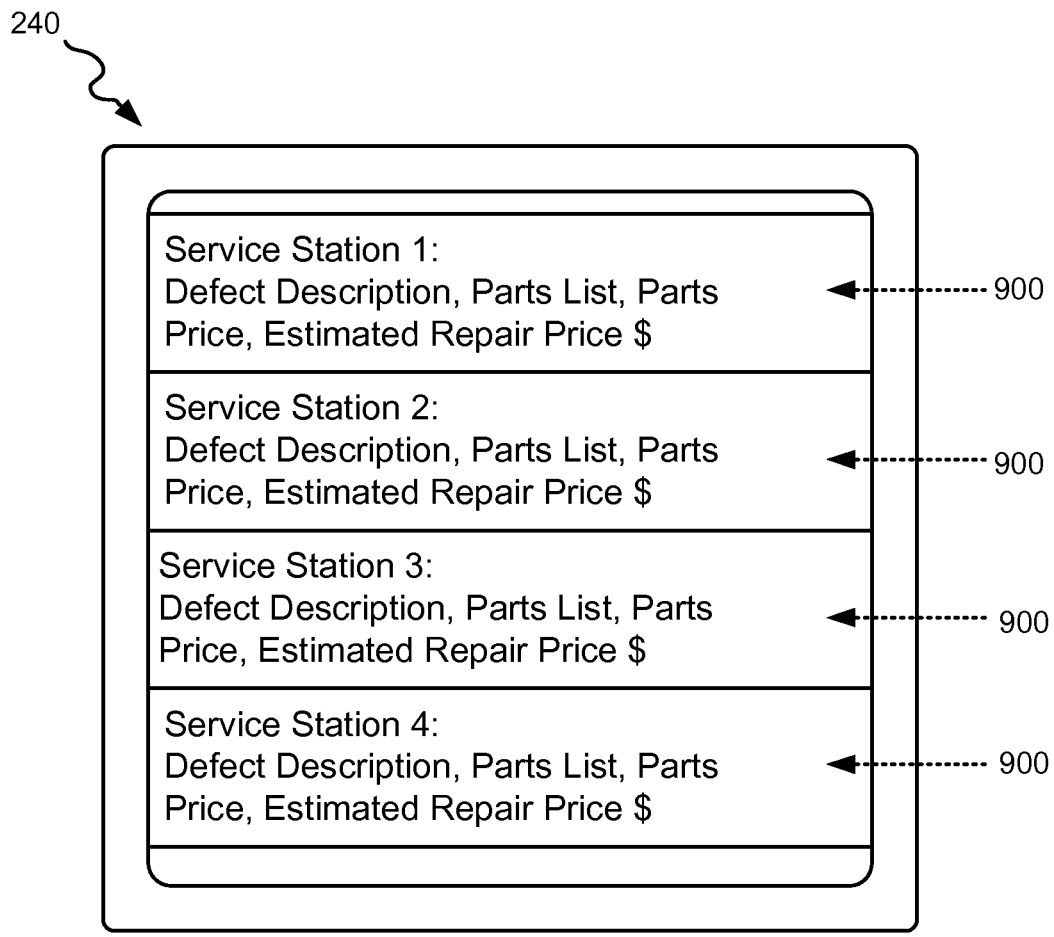
FIGS. 9-11 are diagrams depicting exemplary on-board displays associated with certain blocks of the exemplary process of FIGS. 5A, 5B and 5C.

In the first exemplary implementation depicted in FIG. 5B, in which one or more service stations interact directly with automobile 105, one or more of the service stations notified by data center 125 in block 520 may notify the automobile owner about maintenance issue(s) or defect(s) via on-board alerts and may provide a defect description and estimate of a repair price (block 525). The one or more service stations may further provide a list of required replacement parts (possibly listed by manufacturer), and an available service schedule for scheduling a service appointment. The one or more service stations may also provide other commercial promotions (e.g., discounts, electronic coupons, etc.). The one or more service stations may send the notification via network 120 and network 110 to AMS 135 for display via on-board display 240. As shown in the exemplary messaging diagram of FIG. 7, service station(s) 115 may send a defect notification message 700 that includes a defect description and a repair price estimate. FIG. 9 depicts an example of on-board alerts received at AMS 135 and displayed on on-board display 240. As shown in FIG. 9, the on-board alerts may include multiple alerts 900, each of which may include a service station identification, a defect description, a parts lists, a parts price, and/or an estimated repair price. Each of alerts 900 may include other information such as, for example, brand names of available parts in the parts lists, customer quality ratings associated with each brand of available parts in the parts list, and an estimated time for performing the maintenance or repair if the driver/owner brings the automobile to a given service station (e.g., waiting time for the driver/owner).

Figure 7:
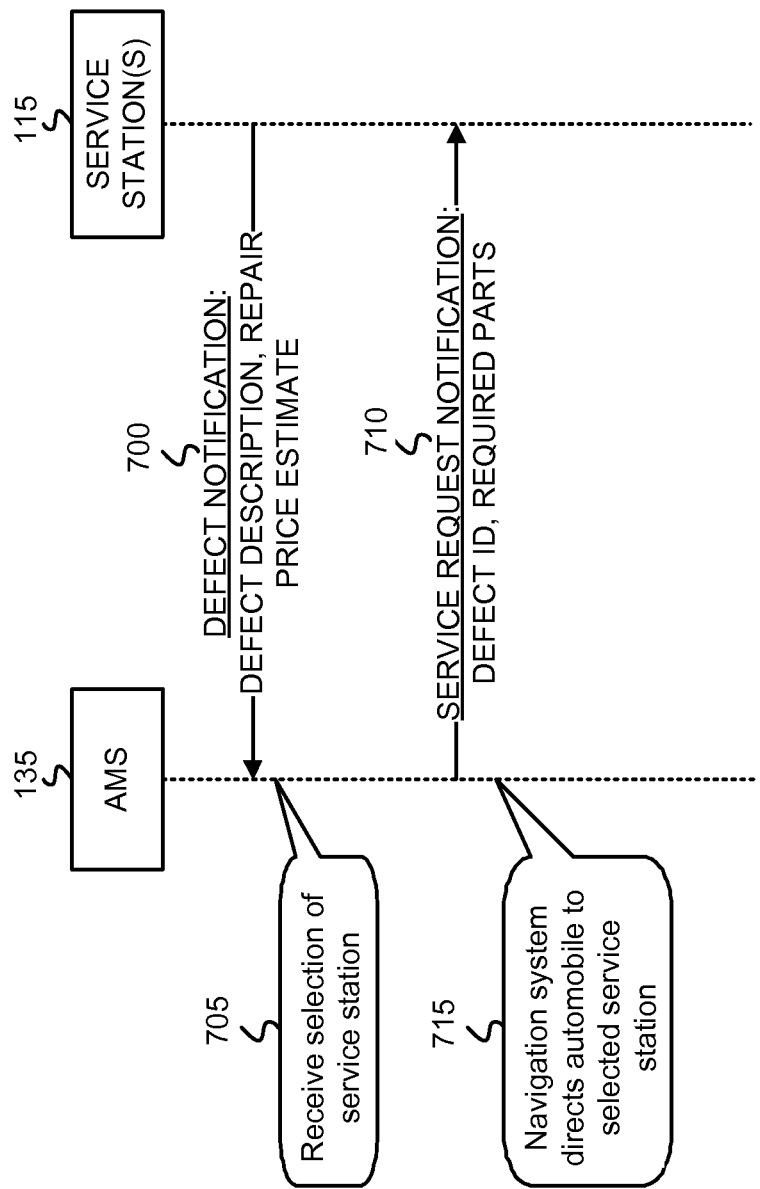
Figure 10:
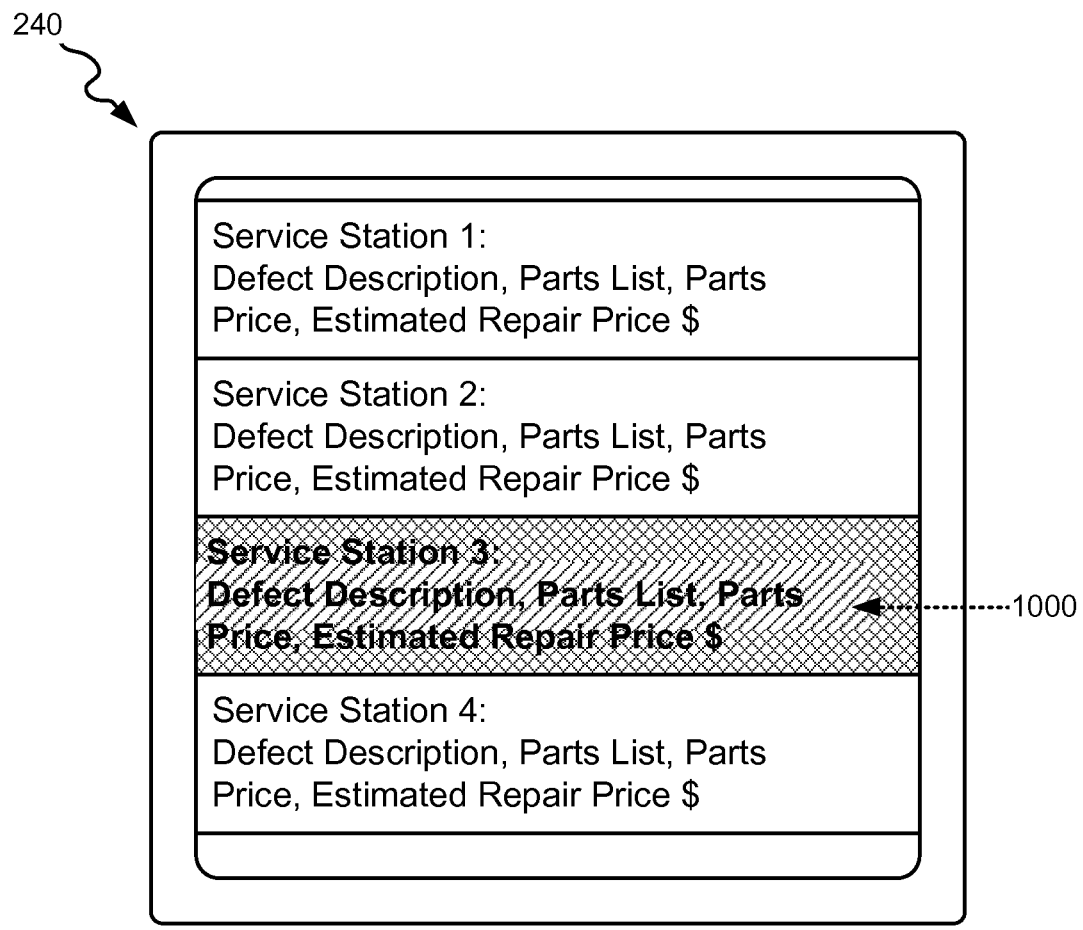

AMS 135 may receive selection of a service station for performing repair and/or maintenance (block 530). The owner/driver of automobile 105 may select, via input device 230 and/or on-board display 240, which service station from which a notification was received in block 525 to perform repair and/or maintenance of the defect(s) noted in the received notification. As depicted in FIG. 7, AMS 135 may receive 705 a selection of the service station. FIG. 10 further depicts selection 1000 of an alert from alerts 900 of FIG. 9, to select a service station to perform repair and/or maintenance on automobile 105.

AMS 135 may notify the selected service station that the automobile will be arriving for service, along with a defect identification, a required parts list, etc. (block 535). AMS 135, subsequent to receiving the service station selection in block 530, may send a notification to the selected service station 115 via wireless communication I/F 220, wireless network 110 and network 120. As shown in FIG. 7, AMS 135 may send a service request notification message 710 to the selected service station 115 that includes a defect identification, a list of required parts for performing the repair, etc.

Figure 11:
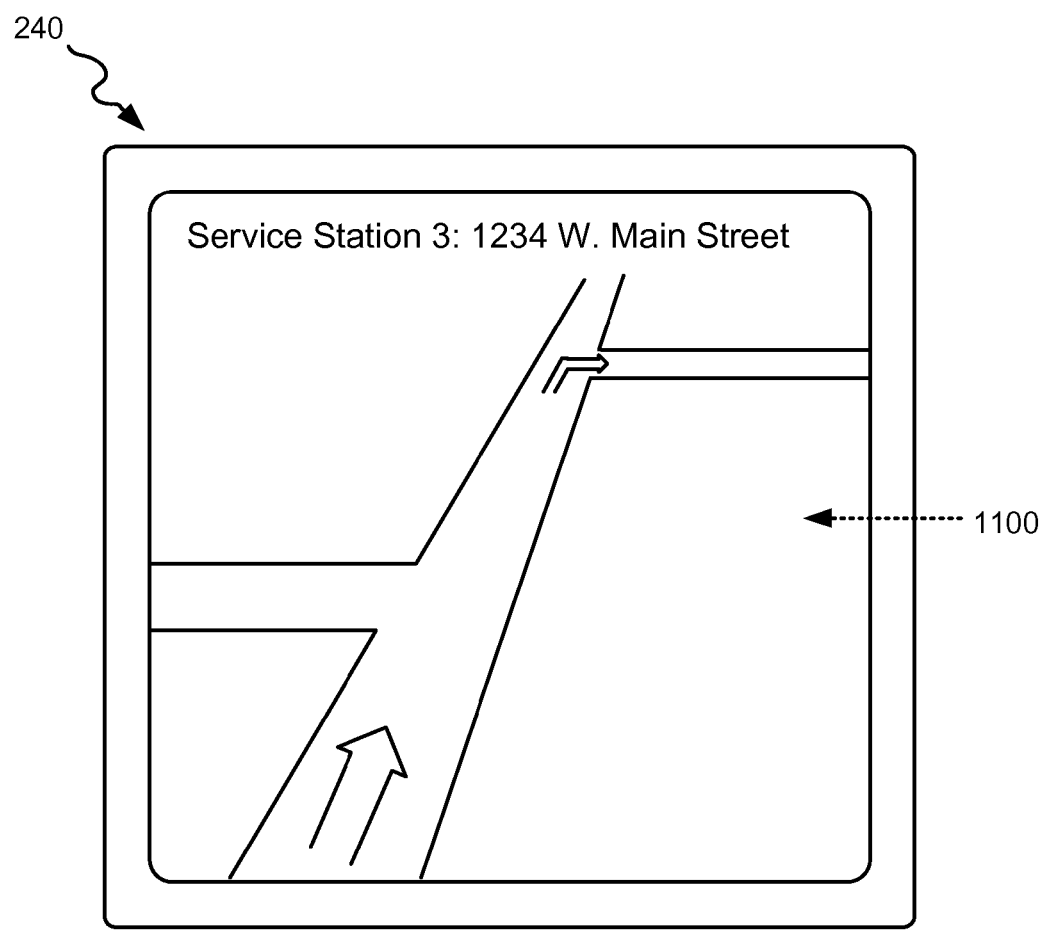

Navigation system 270 may direct automobile 105 to the selected service station (block 540). Navigation system 270 may provide navigation information to the owner/driver of automobile 105 via on-board display 240. The navigation information may include, for example, map information along with associated driving directions to follow the map to the selected service station 115. FIG. 7 depicts the navigation system of AMS 135 directing 715 the automobile to the selected service station. FIG. 11 further depicts an example of map directions to the selected service station, generated by navigation system 270, being provided via display 240.

Figure 8:
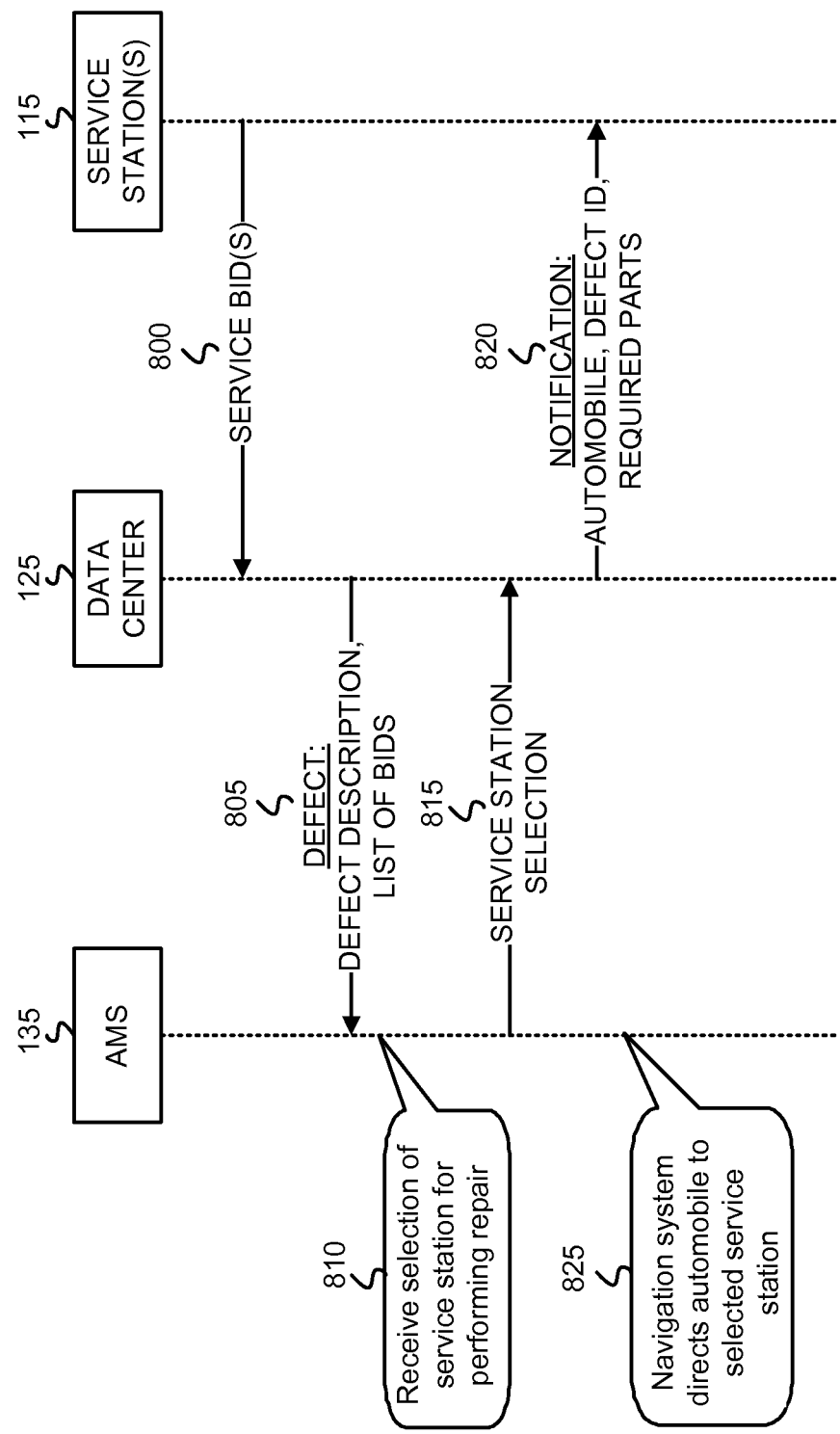

In the exemplary implementation depicted in FIG. 5C, in which one or more service stations that propose performing maintenance/repair on automobile 105 may interact with data center 125, which, in turn, may provide service bids, defect descriptions, etc. to automobile 105, data center 125 may receive service bids from service stations for repairing the defect(s) (block 545). Subsequent to receiving the information sent from data center 125 in block 520, one or more service stations may send service repair bids for performing maintenance and/or defect repair to data center 125 via network 120. The exemplary messaging diagram of FIG. 8 depicts service bid 800 being sent from service stations 115 to data center 125.

Data center 125 may provide an on-board alert of the defect(s), including a defect description(s), and a list of bids from the service stations (block 550). After receiving the service bids in block 545, data center 125 may send a notification message that includes a defect description and a list of bids from bidding service stations. The notification message may be displayed as an on-board alert via on-board display of AMS 135. As shown in FIG. 8, data center 125 may send a defect notification message 805 to AMS 135 that includes a defect description and a list of bids from service stations 115.

Data center 125 may receive a selection of a service station for performing repair and/or maintenance from AMS 135 (block 555). The owner/driver of automobile 105 may, via input device 230 and/or on-board display of AMS 135, select one of the bidding service stations to perform repair and/or maintenance. FIG. 8 depicts AMS 135 receiving 810 the selection of the service station for performing the repair and/or maintenance, and a service station selection message 815, which identifies the selected service station, being sent from AMS 135 to data center 125.

Data center 125 may notify the selected service station that automobile 105 will be arriving for service, along with an identification of defect(s), required parts, etc. (block 560). After receiving the selection of the service station, in block 555, from the owner/driver of automobile 105, data center 125 may send a message to the selected service station via network 120 that includes a notification that automobile 105 will be arriving for service, an identification of the defect(s), a list of required parts, etc. FIG. 8 depicts data center 125 sending a notification message 820 to service station 115, where message 820 includes an automobile identification, a defect identification, and a required parts list.

Navigation system 270 may direct automobile 105 to the selected service station (block 565). Navigation system 270 may provide navigation information to the owner/driver of automobile 105 via on-board display 240. The navigation information may include, for example, map information along with associated driving directions to follow the map to the selected service station 115. FIG. 8 shows the navigation system of AMS 135 directing 825 the automobile to the selected service station. FIG. 11 further depicts an example of map directions to the selected service station, generated by navigation system 270, being provided via on-board display 240.

Exemplary embodiments described herein describe a system that implements an automated automobile maintenance service that uses a network-connected expert system to analyze sensor, and associated data, sent from an automobile to a central data center to diagnose maintenance issues and/or automobile defects that require maintenance and/or repair. The automated system may reduce time and labor costs by shifting the automobile diagnosis to a centralized expert system such that the automobile defect, and the associated replacement parts, may be known by the automobile owner before the automobile is driven to the service station for repair. The automated system described herein further provides the automobile owner with more consumer choice, by providing a selection of service stations, and their corresponding costs for performing maintenance and/or repair, prior to the owner taking the automobile in for repair. The automated system described herein additionally provides the automobile owner with more transparency in the repair process, by enabling owner access to historical data about the owner's automobile, by providing defect diagnosis information to the owner that includes a description of the defect, and corresponding required replacement parts, and by providing repair price information from multiple service stations to enable the owner to reduce repair costs by shopping around.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5A, 5B and 5C, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   maintaining, by a data center comprising one or more network devices, an expert knowledgebase that stores historical sensor data obtained from sensors disposed in a plurality of automobiles and historical repair data associated with the plurality of automobiles;
   receiving, at the data center, first sensor data associated with automobile maintenance sensors from an automobile maintenance system of a first automobile via a first network comprising a wireless satellite network or a Public Land Mobile Network (PLMN);
   storing the first sensor data in the historical sensor data of the expert knowledgebase;
   analyzing, by one of the one or more network devices using an expert system, the first sensor data based on the historical sensor and repair data stored in the expert knowledgebase to identify one or more maintenance problems or one or more automobile defects, associated with the first automobile, that correspond to certain patterns in the historical sensor or the repair data;
   sending, from the data center via a second network, the identified one or more maintenance problems or one or more automobile defects associated with the first automobile to service stations near a location of the first automobile or a location of a person associated with the first automobile for scheduling maintenance or repair of the one or more maintenance problems or automobile defects;
   receiving service bids, via the second network, from one or more of the service stations for performing the maintenance or repair of the one or more maintenance problems or automobile defects;
   providing an alert, via the first network, to the automobile maintenance system of the one or more maintenance problems or automobile defects, including a description of the one or more maintenance problems or automobile defects and a list of bids from the one or more service stations;
   receiving, from the automobile maintenance system via the first network, selection of a service station of the one or more service stations for performing maintenance or repair; and
   notifying the selected service station that the first automobile will be arriving for service including an identification of the one or more maintenance problems or automobile defects, and parts required for performing the maintenance or repair of the one or more maintenance problems or automobile defects.

2. The method of claim 1, further comprising:
   receiving, at the data center comprising the one or more network devices, second sensor data associated with automobile maintenance sensors from an automobile maintenance system of a second automobile via the first wireless network;
   storing the second sensor data in the historical sensor data of the expert knowledgebase;
   analyzing, at the one of the one or more network devices using the expert system, the second sensor data based on the historical sensor and repair data stored in the expert knowledgebase to identify one or more maintenance problems or one or more automobile defects, associated with the second automobile, that correspond to certain patterns in the historical sensor or repair data; and
   sending, via the second network, the identified one or more maintenance problems or one or more automobile defects associated with the second automobile to service stations near a location of the second automobile or a location of a person associated with the second automobile for scheduling maintenance or repair of the one or more maintenance problems or defects.

3. The method of claim 1, wherein the automobile maintenance sensors comprise an array of maintenance sensors that sense or measure various parameters associated with the operation of the automobile.

4. The method of claim 3, wherein the array of maintenance sensors include sensors that detect one or more parameters associated with drive-train and vehicle control, driver safety, comfort, or emissions; sensors that monitor temperature, gases, voltages, currents, air flow, vacuum or torques associated with the operation of the automobile; sensors that detect or measure tire pressure, brake pad status, battery voltages, engine temperature, or spark plug voltages; a sensor that detects engine Revolutions Per Minute (RPM); a sensor that measures the rate at which a wheel of the automobile is turning compared to the speed of the automobile; a sensor that detects a throttle position; a sensor that measures a speed of the automobile; or still image or video cameras or audio sensors that may sense images, video or audio associated with the automobile.

5. A system, comprising:
   a database configured to store an expert knowledgebase that further stores historical sensor data obtained from sensors disposed in a plurality of automobiles and historical repair data associated with the plurality of automobiles;

a communication interface coupled to a network;

one or more processing units configured to implement an expert system and to:

receive, via the communication interface, first sensor data associated with sensors from a first automobile maintenance system associated with a first automobile, receive, via the communication interface, second sensor data associated with sensors from a second automobile maintenance system associated with a second automobile, analyze the first sensor data, using the expert system, based on the historical sensor and repair data stored in the expert knowledgebase to identify one or more maintenance problems or one or more automobile defects, associated with the first automobile, that correspond to certain patterns in the historical sensor or repair data, analyze the second sensor data, using the expert system, based on the historical sensor and repair data stored in the expert knowledgebase to identify one or more maintenance problems or one or more automobile defects, associated with the second automobile, that correspond to certain patterns in the historical sensor or repair data, send, via the network, the identified one or more maintenance problems or one or more automobile defects associated with the first automobile to one or more first service stations near a location of the first automobile or a location of a person associated with the first automobile for scheduling maintenance or repair of the first automobile, send, via the network, the identified one or more maintenance problems or one or more automobile defects associated with the second automobile to one or more second service stations near a location of the second automobile or a location of a person associated with the second automobile for scheduling maintenance or repair of the second automobile, receive first service bids from the one or more first service stations for performing the maintenance or repair of the first automobile, send a first message to the first automobile that includes an identification of the one or more maintenance problems or automobile defects associated with the first automobile and a list comprising the received first service bids from the one or more first service stations, receive a selection of a first service station from the one or more first service stations for performing repair and/or maintenance of the first automobile, and send a second message notifying the selected first service station that the first automobile will be arriving for service, including an identification of the one or more maintenance problems or automobile defects, and parts required for performing the maintenance or repair of the one or more maintenance problems or automobile defects.

6. The system of claim 5, wherein the sensors include sensors that detect one or more parameters associated with drive-train and vehicle control, driver safety, comfort or emissions; sensors that monitor temperature, gases, voltages, currents, air flow, vacuum or torques associated with the operation of the first automobile; sensors that detect or measure tire pressure, brake pad status, battery voltages, engine temperature, or spark plug voltages; a sensor that detects engine Revolutions Per Minute (RPM); a sensor that measures the rate at which a wheel of the first automobile is turning compared to the speed of the first automobile; a sensor that detects a throttle position; a sensor that measures a speed of the first automobile; or still image cameras, video cameras or audio sensors that may sense images, video or audio associated with the first automobile.

7. The system of claim 5, wherein the first automobile maintenance system is installed at the first automobile and the second automobile maintenance system is installed at the second automobile.

8. The system of claim 5, wherein the one or more processing units are further configured to:

store the received first and second sensor data in the expert knowledgebase; and store the identified one or more maintenance problems or one or more automobile defects associated with the first automobile and the second automobile in the expert knowledgebase.

9. The system of claim 5, wherein the second message notifying the selected service station that the first automobile will be arriving for service includes an identification of the one or more maintenance problems or automobile defects associated with the first automobile and parts required for servicing the first automobile.

10. The system of claim 5, wherein the sensors of the first automobile maintenance system comprise an array of maintenance sensors that sense or measure various parameters associated with the operation of the first automobile.

11. The system of claim 5, wherein the one or more processing units are further configured to:

receive service bids from the one or more second service stations for performing the maintenance or repair of the second automobile; and send a first message to the second automobile that includes an identification of the one or more maintenance problems or automobile defects associated with the second automobile and a list comprising the received service bids from the one or more service stations.

12. The system of claim 11, wherein the one or more processing units are further configured to:

receive a selection of a service station one or more service stations for performing repair and/or maintenance of the second automobile; and send a second message notifying the selected service station that the second automobile will be arriving for service.

13. The system of claim 12, wherein the second message notifying the selected service station that the second automobile will be arriving for service includes an identification of the one or more maintenance problems or automobile defects associated with the second automobile and parts required for servicing the second automobile.

14. A method, comprising:

maintaining, by a data center comprising one or more network devices, an expert knowledgebase that stores historical sensor data obtained from sensors disposed in a plurality of automobiles and historical repair data associated with the plurality of automobiles;

receiving, at the data center from a remotely located first automobile, first sensor data associated with sensors from a first automobile maintenance system of the first automobile;

receiving, at the data center from a remotely located second automobile, second sensor data associated with sensors from a second automobile maintenance system of the second automobile;

analyzing, by one of the one or more network devices using an expert system, the first sensor data based on the historical sensor and repair data stored in the expert knowledgebase to identify one or more maintenance problems or one or more automobile defects, associated with the first automobile, that correspond to certain patterns in the historical sensor or repair data; and analyzing, by the one of the one or more network devices using the expert system, the second sensor data based on the historical sensor and repair data stored in the expert knowledgebase to identify one or more maintenance problems or one or more automobile defects, associated with the second automobile, that correspond to certain patterns in the historical sensor or repair data; and sending, from the data center via a network, the identified one or more maintenance problems or one or more automobile defects of the first and second automobiles to one or more entities external to the data center;

receiving service bids from the one or more entities external to the data center for performing the maintenance or repair of the one or more maintenance problems or automobile defects associated with the first automobile;

providing a first alert to the first automobile maintenance system of the one or more maintenance problems or automobile defects associated with the first automobile, including a description of the one or more maintenance problems or automobile defects and a first list of bids from the one or more entities external to the data center;

receiving, from the first automobile maintenance system, selection of a first entity of the one or more entities external to the data center for performing maintenance or repair; and notifying the first entity that the first automobile will be arriving for service including an identification of the one or more maintenance problems or automobile defects associated with the first automobile, and parts required for performing the maintenance or repair of the one or more maintenance problems or automobile defects associated with the first automobile.

15. The method of claim 14, wherein the entities external to the data center comprise service stations that perform maintenance or repair of automobiles.

16. The method of claim 14, further comprising:
storing the first and second sensor data in the historical sensor data of the expert knowledgebase.

17. The method of claim 14, further comprising:
receiving service bids from the one or more entities external to the data center for performing the maintenance or repair of the one or more maintenance problems or automobile defects associated with the second automobile;

providing a second alert to the second automobile maintenance system of the one or more maintenance problems or automobile defects associated with the second automobile, including a description of the one or more maintenance problems or automobile defects and a second list of bids from the one or more entities external to the data center;

receiving, from the second automobile maintenance system, selection of a second entity of the one or more entities external to the data center for performing maintenance or repair; and notifying the second entity that the second automobile will be arriving for service including an identification of the one or more maintenance problems or automobile defects associated with the second automobile, and parts required for performing the maintenance or repair of the one or more maintenance problems or automobile defects associated with the second automobile.

* * * * *